US009465851B2

(12) United States Patent
Kishi et al.

(10) Patent No.: US 9,465,851 B2
(45) Date of Patent: Oct. 11, 2016

(54) SEARCH APPARATUS CONFIGURED TO UTILIZE SUPPLEMENTAL INFORMATION TO IDENTIFY AN INDEX ASSOCIATED WITH A CAPTURED IMAGE, SEARCH METHOD, AND SEARCH SYSTEM CONFIGURED TO PERFORM THE SAME

(71) Applicants: Hidenobu Kishi, Kanagawa (JP); Takayuki Kunieda, Tokyo (JP); Tetsuya Ikeda, Tokyo (JP)

(72) Inventors: Hidenobu Kishi, Kanagawa (JP); Takayuki Kunieda, Tokyo (JP); Tetsuya Ikeda, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 237 days.

(21) Appl. No.: 13/911,193

(22) Filed: Jun. 6, 2013

(65) Prior Publication Data

US 2014/0006387 A1     Jan. 2, 2014

(30) Foreign Application Priority Data

Jun. 29, 2012   (JP) ............................... 2012-0148050

(51) Int. Cl.
*G06F 17/30*          (2006.01)
(52) U.S. Cl.
CPC ... *G06F 17/30554* (2013.01); *G06F 17/30879* (2013.01)
(58) Field of Classification Search
CPC ............................................... G06F 17/30879
See application file for complete search history.

(56) References Cited

U.S. PATENT DOCUMENTS

| 7,933,338 B1 * | 4/2011 | Choudhry et al. ....... 375/240.26 |
| 8,458,038 B2 | 6/2013 | Ando |
| 2003/0063575 A1 | 4/2003 | Kinjo |
| 2007/0199031 A1 * | 8/2007 | Nemirofsky ...... G06F 17/30277 725/88 |
| 2009/0327894 A1 * | 12/2009 | Rakib et al. .................. 715/719 |
| 2011/0282906 A1 * | 11/2011 | Wong ............................. 707/780 |

FOREIGN PATENT DOCUMENTS

| JP | 2003-178221 A | 6/2003 |
| JP | 2005-215922 A | 8/2005 |
| JP | 2011-239315 | 11/2011 |
| WO | WO 2007/023992 A1 | 3/2007 |

* cited by examiner

*Primary Examiner* — Robert Beausoliel, Jr.
*Assistant Examiner* — Hau H Hoang
(74) *Attorney, Agent, or Firm* — Harness, Dickey & Pierce, P.L.C.

(57) ABSTRACT

A search apparatus includes a storage unit configured to store indexes for searching for an object included in an image, link information indicating a function of providing a link for the object, and first supplementary information in association with each other; a receiving unit configured to receive a captured image through a network; a searching unit configured to search for an index for searching for an object included in the received captured image from among the indexes stored in the storage unit based on the object included in the received captured image and second supplementary information for the received captured image, the index being identified based on the first supplementary information and the second supplementary information for the received captured image; and a presenting unit configured to present the link information associated with the index searched for by the searching unit to a source that has transmitted the captured image.

18 Claims, 7 Drawing Sheets

| ID | INDEX DATA |
|---|---|
| aaa001 | (BINARY DATA) |
| | |
| | |

| ID | BROADCAST TIME |
|---|---|
| aaa001 | (XML CODE/XML FILE NAME) |
| | |
| | |

┌<timeline>
  │   142─→<area>x1,y1,x2,y2</area>
  │      144┌<start>MM,DD,hh,mm,ss</start>
  │         └<end>MM,DD,hh,mm,ss</end>
  │       ┌<link>
  │       │              <title>****Shop Web Page</title>
141₁┤ 143₁┤              <type>info</type>
  │       │              <URI>http://1.example.org/index.html</URI>
  │       └</link>
  │       ┌<link>
  │   143₂┤   :
  │       └</link>
  └</timeline>
  ┌<timeline>
141₂┤   :
  └</timeline>

```

… # SEARCH APPARATUS CONFIGURED TO UTILIZE SUPPLEMENTAL INFORMATION TO IDENTIFY AN INDEX ASSOCIATED WITH A CAPTURED IMAGE, SEARCH METHOD, AND SEARCH SYSTEM CONFIGURED TO PERFORM THE SAME

CROSS-REFERENCE TO RELATED APPLICATION

The present application claims priority to and incorporates by reference the entire contents of Japanese Patent Application No. 2012-148050 filed in Japan on Jun. 29, 2012.

BACKGROUND OF THE INVENTION

1. Field of the Invention

The present invention relates to a search apparatus, a search method, and a search system.

2. Description of the Related Art

A technique is already known in which objects and pieces of link information that provides a link for each object are stored in a server or the like in association with each other, and an object corresponding to an object included in an image of a paper medium such as a magazine or a document captured by a user is searched for in the server (see Publication of Japanese Translation of PCT Application No. 2009-506393). A technique that presents link information associated with an object searched for to a user is also already known.

In recent years, there has been a proliferation of digital information distribution systems, such as digital signage and digital television broadcasting, which distribute information using digital data. In such a digital information distribution system, a mechanism is prepared in which information provision is not limited to one-way from an information distribution source to a user, and the user is allowed to return an action in response to the information provision from the information distribution source. Japanese Patent Application Laid-open No. 2011-239315 discloses a technique in which interactive information exchange is allowed between the broadcasting station side and the broadcasting receiving terminal side in digital broadcasting.

There is another technique of superimposing the location of related information or the like on displayed information on a display screen. The location of the related information is displayed on the display screen as a message such as a uniform resource locator (URL) or a telephone number.

However, in the conventional digital broadcasting, even when a user is allowed to return an action through a broadcasting receiving terminal to a broadcasting station, an information path is closed between the broadcasting station and the broadcasting receiving terminal, being insufficient as a means for guiding the user directly to information related to the displayed information. In a method using messages, a user is required to remember a displayed message by, for example, taking a note of it and input it to a computer or the like, which may cause an input mistake.

It is required not to limit the provision of link information based on a captured image to a still image medium such as a paper medium and to extend a subject to be captured to various media including a broadcast medium (display screen) that is distributed and displayed by the digital information distribution system and other moving image media.

Therefore, there is a need to provide link information based on a captured image flexibly.

SUMMARY OF THE INVENTION

It is an object of the present invention to at least partially solve the problems in the conventional technology.

According to an embodiment, there is provided a search apparatus that includes a storage unit configured to store therein indexes for searching for an object included in an image, link information indicating a function of providing a link for the object, and first supplementary information in association with each other; a receiving unit configured to receive a captured image through a network; a searching unit configured to search for an index for searching for an object included in the received captured image from among the indexes stored in the storage unit based on the object included in the received captured image and second supplementary information for the received captured image, the index being identified based on the first supplementary information and the second supplementary information for the received captured image; and a presenting unit configured to present the link information associated with the index searched for by the searching unit to a source that has transmitted the captured image.

According to another embodiment, there is provided a search method that includes receiving a captured image through a network; searching for an index for searching for an object included in the received captured image from among indexes stored in a storage unit based on the object included in the received captured image and second supplementary information for the received captured image, the index being identified based on first supplementary information and the second supplementary information for the received captured image, the storage unit storing therein the indexes for searching for an object included in an image, link information indicating a function of providing a link for the object, and first supplementary information in association with each other; presenting the link information associated with the index searched for by the searching unit to a source that has transmitted the captured image.

According to still another embodiment, there is provided a search system that includes a search apparatus configured to be connected to a network; and a terminal unit configured to transmit a captured image to the search apparatus through the network. The search apparatus includes a storage unit configured to store therein indexes for searching for an object included in an image, and link information indicating a function of providing a link for the object, and first supplementary information in association with each other; and an information processing unit. The information processing unit includes a receiving unit configured to receive the captured image; a searching unit configured to search for an index for searching for an object included in the received captured image from among the indexes stored in the storage unit based on the object included in the received captured image and second supplementary information for the received captured image, the index being identified based on the first supplementary information and the second supplementary information for the received captured image; and a presenting unit configured to present the link information associated with the index searched for by the searching unit to the terminal unit.

The above and other objects, features, advantages and technical and industrial significance of this invention will be better understood by reading the following detailed descrip-

BRIEF DESCRIPTION OF THE DRAWINGS

FIG. 5 is a diagram illustrating an exemplary XML code according to the embodiment;

DETAILED DESCRIPTION OF THE PREFERRED EMBODIMENTS

Figure 1:
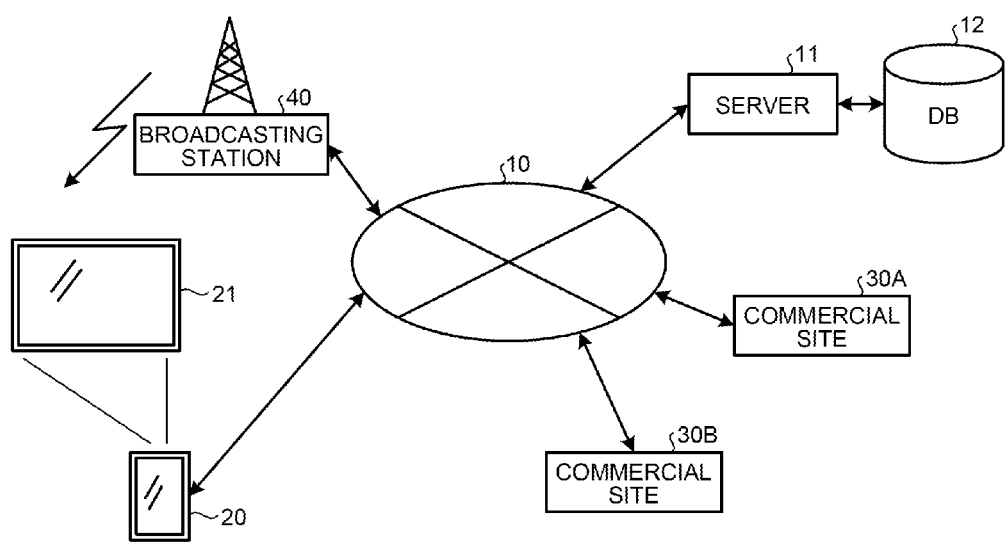
FIG. 1 is a diagram illustrating an exemplary configuration of a search system according to an embodiment of the present invention.

Hereinafter, embodiments of a search apparatus, a search method, and a computer program will be described in detail with reference to the accompanying drawings. FIG. 1 is a diagram illustrating an exemplary configuration of a search system according to an embodiment.

A server 11 and a terminal unit 20 are connected to a network 10. The network 10 is, for example, the Internet, and the Transmission Control Protocol/Internet Protocol (TCP/IP) is applied as its communication protocol. The network 10 may be a network cloud as a network group that includes a plurality of computers connected through a network and exposes only its input and output to the outside with its inside concealed as a black box.

A broadcasting station 40 is connected to the network 10. The broadcasting station 40 provides television broadcasting by, for example, the terrestrial digital broadcasting. For example, the airwaves transmitted from the broadcasting station 40 are received by an antenna (not illustrated) and input to a television receiver 21 at individual households. The screens of a broadcast program are then displayed on the television receiver 21. The broadcasting station 40 can provide a schedule of programs to be broadcast to the outside through the airwaves, the network 10, or the like using, for example, the electronic program guide (EPG).

The broadcasting station 40 is not limited to a broadcasting station of the terrestrial digital broadcasting. The broadcasting station 40 may be any broadcasting station that delivers data broadcasting together with television broadcasting such as the broadcasting satellite (BS) digital television broadcasting and the communications satellite (CS) digital television broadcasting.

A plurality of commercial sites 30A and 30B are connected to the network 10. These commercial sites 30A and 30B can, for example, ship merchandise in response to orders made through the network 10.

The terminal unit 20 can perform communications with the network 10 by air or by cable. The terminal unit 20 can perform operations in accordance with orders received through the network 10, display images or the like received through the network 10 on a user interface (UI) including a display device and an input device, and transmit data to the network 10 in accordance with user operations made on the UI.

The terminal unit 20 has an image capture function and is configured to capture an image of a subject in accordance with an image capture operation onto the UI. The terminal unit 20 can transmit a captured image obtained by image capture to the network 10. For example, the terminal unit 20 captures an image of the display screen of the television receiver 21 and transmits the captured image to the server 11 through the network 10.

The server 11, to which a database (DB) 12 is connected, can perform search processing according to the embodiment on the DB 12 in accordance with requests received through the network 10. In the embodiment, the DB 12 stores therein index data for searching for a plurality of pieces of image data 50A and 50B in association with link information. The index data is data obtained by analyzing the binary of the image, or data obtained by converting the image data into a structure for searching.

The image data may be directly stored in the DB 12. The file name and path of the image data may be stored in the DB 12.

The image data from which the index data is derived to be stored in the DB 12 is image data provided from the broadcasting station 40 or to be provided to the broadcasting station 40, and is, for example, image data to be used in data broadcasting by the broadcasting station 40.

The server 11 receives the image data through the network 10, searches the DB 12 based on the received image data and retrieves link information corresponding to the image data as a search result. The server returns the link information retrieved as the search result to the source that has transmitted the image data.

Figure 2A:
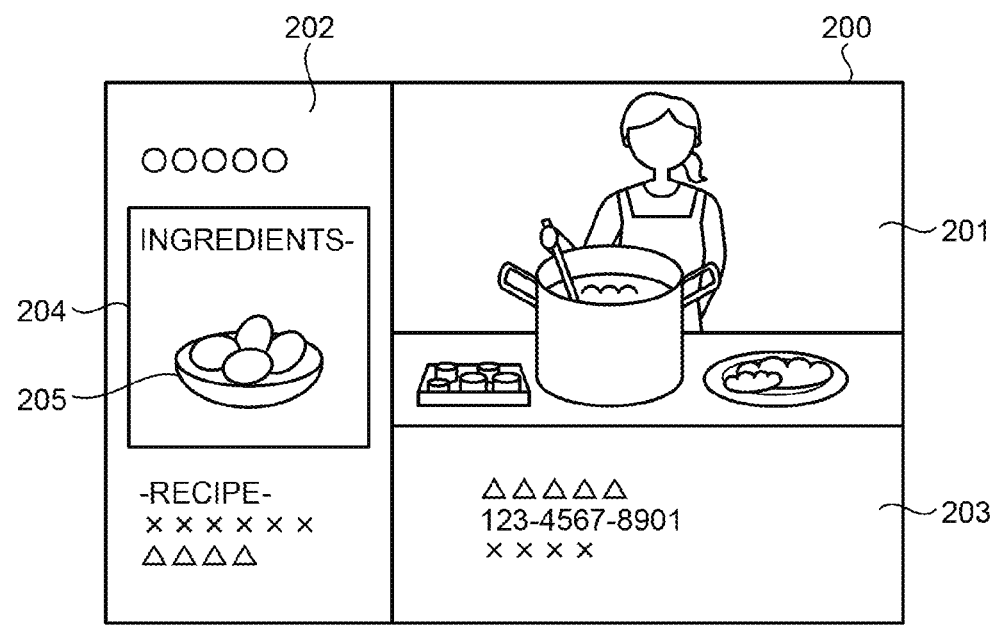
FIG. 2A illustrates examples of a broadcast screen and image data from which index data is derived to be stored in a database (DB)
Figure 2B:
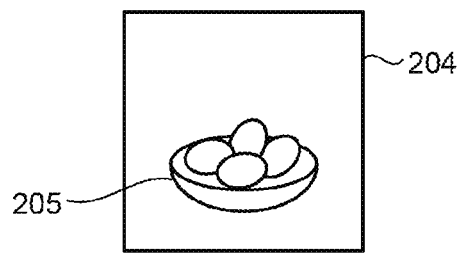
FIG. 2B illustrates examples of a broadcast screen and image data from which index data is derived to be stored in a database (DB)

FIGS. 2A and 2B illustrate examples of a broadcast screen broadcast by the broadcasting station 40 and image data from which index data is derived to be stored in the DB 12. Illustrated in FIG. 2A is an example of a display screen 200 of the television receiver 21. The example of FIG. 2A illustrates an example in which a television broadcast screen 201 by television broadcasting and data broadcast screens 202 and 203 by data broadcasting are displayed on the display screen 200 simultaneously. It is assumed that a cooking program is being broadcast in the television broadcasting in FIG. 2A.

For example, with the television broadcast screen 201 displayed on the display screen 200 of the television receiver 21 in a full-screen manner, the data broadcast screens 202 and 203 are displayed by performing a predetermined operation on the television receiver 21. The data broadcast screens 202 and 203 are displayed on the display screen 200 with their sizes and positions designated by the data broadcasting for the data broadcast screens 202 and 203. The television broadcast screen 201 is subjected to size reduction and movement of its display position in accordance with the sizes and positions of the data broadcast screens 202 and 203.

Display control information for displaying the data broadcast screens 202 and 203 is written in, for example, the Broadcast Markup Language (BML), which is one of the markup languages. The BML is obtained from the Extensible Markup Language (XML), which is one of the markup languages, and is specialized for Japan's data broadcasting.

The BML can define frames as is the case with the HyperText Markup Language (HTML), which is one of the markup languages and is frequently used for web pages. The frames divide one screen and allow display generally with a different BML file for each divided area. In the example of FIG. 2A, three frames are defined for separately displaying the data broadcast screens 202 and 203 and the television broadcast screen 201.

In the example of FIG. 2A, the data broadcast screens 202 and 203 display information related to the broadcast displayed on the television broadcast screen 201. As an example, the data broadcast screen 202 displays the name and recipe of cooking being demonstrated in the broadcast of the television broadcast screen 201 as text information, and an image 204 including an object 205 that is an ingredient of the dish. The data broadcast screen 203 displays, for example, information on a retailer (telephone number, Uniform Resource Locator (URL), or the like) of the ingredient displayed as the object 205 in the image 204.

The object is the image of the main object within an image represented by image data and is distinguished from the background image of the main object and the accompanying information of the main object within the image.

In the embodiment, the DB 12 stores therein index data based on image data for use in display on the data broadcast screens 202 and 203. For example, the DB 12 stores therein index data based on image data for displaying the image 204 of the ingredient exemplified in FIG. 2B displayed on the data broadcast screen 202. The information displayed on the data broadcast screen 203 is stored in association with the image 204 as the link information of the image 204.

The server 11 may acquire the image 204 and its link information from the broadcasting station 40 through the network 10. Without being limited thereto, the image 204 and the link information may be provided from the server 11 to the broadcasting station 40. When acquiring the image 204 and its link information, the server 11 further acquires information on the broadcast time of the data broadcast with the image 204 from the broadcasting station 40. The information on the broadcast time may be acquired as actual time information or may be acquired as the identifying information of a program of the television broadcast that is broadcast together with the data broadcast. When the broadcast time is acquired as the identifying information of a program, the server 11 can acquire the actual time information by, for example, referring to an EPG. The server 11 stores the acquired information on the broadcast time in DB 12 in association with the index data of the corresponding image 204.

The link information will be described. The link information is, for example, information indicating a function that provides a link for an object included in an image. An example of the link information is information that includes an access method for accessing the attribute information of the object. The link information is, in practice, stored in the DB 12 in association with an object included in an image.

Without being limited thereto, the link information may include information that informs a communication site or the like on the network 10 of the information of the object. The link information may also include a function of transmitting opinions about the object or the like. In such cases, for example, the URL of a site on the network 10 that performs these functions may be used as the link information.

As an example, for the object 205 included in the image 204 of FIG. 2B, the link information is the uniform resource locator (URL) of the commercial site 30A that deals in the item indicated by the object 205 or the URL of a purchase site for performing purchase setting for the item. Without being limited thereto, the telephone number or e-mail address of a shop that deals in the item may be used as the link information. Information for downloading a data file including the information of the item or the like may be used as the link information. In the DB 12, a plurality of pieces of link information may be associated with one object.

Figures 3, 4A, 4B:
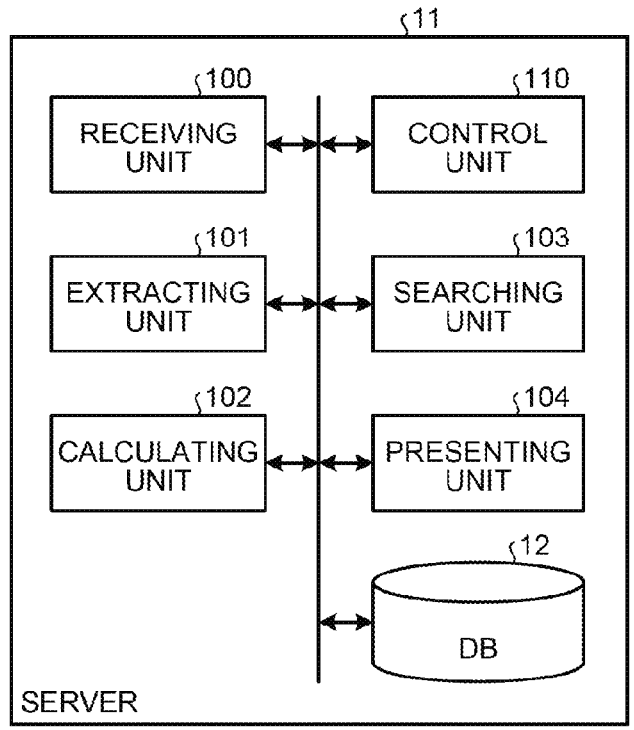
FIG. 3 is an exemplary functional block diagram illustrating the functions of a server according to the embodiment.
FIG. 4A illustrates exemplary configurations of a DB according to the embodiment.
FIG. 4B illustrates exemplary configurations of a DB according to the embodiment.

FIG. 3 is an exemplary functional block diagram illustrating the functions of the server 11. The server 11 includes a receiving unit 100, an extracting unit 101, a calculating unit 102, a searching unit 103, a presenting unit 104, and a control unit 110. FIG. 3 illustrates that the DB 12 is included in the server 11. The control unit 110 controls the entire operation of the server 11.

The receiving unit 100 receives data transmitted through the network 10. For example, the receiving unit 100 receives a captured image transmitted from the terminal unit 20. The receiving unit 100 receives image data transmitted from the broadcasting station 40, the link information of the image data, and the broadcast time of the data broadcast with the image data.

The extracting unit 101 performs image analysis on the captured image received by the receiving unit 100, detects feature points in the captured image, and extracts an object included in the captured image. For example, the extracting unit 101 performs binarization on the captured image, performs edge detection and normalization processing on the binarized image, and detects the feature points of the captured image. The object is represented by the detected feature points.

The calculating unit 102 compares the feature points of a captured image 40A extracted by the extracting unit 101 with feature points that represent objects searched for by indexes stored in the DB 12. Based on the comparison result, the calculating unit 102 calculates the degree of similarity between the object included in the captured image 40A and the object searched for by the indexes stored in the DB 12. The degree of similarity can be determined by, for example, comparing the relation between pairs of feature points extracted from images. As an example, the relation between pairs of feature points is quantified to calculate a characteristic quantity, and the absolute value of the difference of the characteristic quantity is determined between images. When the determined absolute value of the difference is small, the similarity between the images is regarded to be high.

Based on the degree of similarity calculated by the calculating unit 102, the searching unit 103 searches for an image having a high degree of similarity with the object included in the captured image 40A from among the objects searched for by the indexes stored in the DB 12. The searching unit 103 outputs one index including an object having the highest degree of similarity with the object included in the captured image 40A from among the objects searched for by the indexes stored in the DB 12 as a search result.

Without being limited thereto, the searching unit 103 may output, from among the objects searched for by the indexes stored in the DB 12, a predetermined number of indexes in the order of including an object having a high degree of similarity with the object included in the captured image 40A as a search result or may output one or more indexes for searching for an object whose degree of similarity is not less than a threshold as a search result. The searching unit 103 may output an index whose degree of similarity is within a predetermined range (5% or the like) of the maximum value of the degree of similarity calculated for the captured image 40A as a search result.

The presenting unit 104 retrieves the link information associated with the index as a search result by the searching unit 103 from the DB 12 and presents it to the terminal unit 20. This presentation of the link information may be performed by directly transmitting the link information to the terminal unit 20 or may be based on a method that generates a web page including the link information and presents an access method to the web page (URL or the like) to the terminal unit 20. By accessing the web page from the terminal unit 20, the link information can be acquired.

Without being limited thereto, the presented link information may be acquired using application software (hereinafter referred to as an application for short) for performing a series of operations from the capture of the captured image 40A to the display of the presented link information, the application being installed in the terminal unit 20 in advance.

The server 11 may be configured with a general computer apparatus (information processing apparatus) including a central processing unit (CPU), a random access memory (RAM), a read only memory (ROM), and a storage device such as a hard disk drive. The server 11 is not limited to configuration with a single computer apparatus and may be configured so that, for example, it operates on a plurality of computer apparatuses in a distributed manner.

The receiving unit 100, the extracting unit 101, the calculating unit 102, the searching unit 103, the presenting unit 104, and the control unit 110 are achieved by a searching program that operates on the CPU. Without being limited thereto, a part of or the whole of the receiving unit 100, the extracting unit 101, the calculating unit 102, the searching unit 103, the presenting unit 104, and the control unit 110 may be achieved by separated pieces of hardware that cooperate with each other. A searching program for executing searching processing according to the embodiment is recorded and provided on a computer-readable storage medium such as a CD or a DVD as a file in an installable or executable format.

The searching program for executing searching processing according to the embodiment may be stored in a computer connected to a communications network such as the Internet and is provided by being downloaded through the communications network. The searching program for executing searching processing according to the embodiment may be provided or distributed through a communications network such as the Internet.

The searching program for executing searching processing according to the embodiment has, for example, a module structure including the above units (the receiving unit 100, the extracting unit 101, the calculating unit 102, the searching unit 103, the presenting unit 104, and the control unit 110). As actual hardware, the CPU reads the searching program from for example, the storage device and executes it, thereby loading the above units into a main storage (for example, the RAM) and generating the units on the main storage.

In such a configuration, a user captures an image of the display screen 200 of the television receiver 21 using the terminal unit 20. In this example, the captured image is an image obtained by capturing the whole screen of the display screen 200 of the television receiver 21. Without being limited thereto, the captured image may be part of the display screen, for example, an image captured by performing zooming on the image 204. The user transmits the captured image to the server 11 through the network 10.

The receiving unit 100 of the server 11 receives the captured image and its feature points are detected by the extracting unit 101, thereby extracting the object. Based on the feature points detected by the extracting unit 101, the calculating unit 102 calculates the degree of similarity between the object included in the captured image and the objects searched for by the indexes stored in the DB 12. The searching unit 103 searches for the index based on the calculation result. The presenting unit 104 retrieves the link information from the DB 12 based on the search output by the searching unit and presents it to the terminal unit 20, which is the source of the captured image.

Based on the link information presented by the server 11 to the terminal unit 20, the user, for example, accesses the commercial site 30A to purchase the item indicated by the object included in the captured image. In this situation, the user does not have to take a note of the URL or the like of the commercial site 30A.

It is now assumed that an image including an object that is very similar to the object 205 included in the image 204 of FIG. 2B has been captured as a captured image by the terminal unit 20. It is also assumed that the DB 12 stores therein the image 204 (referred to as a first image) including the object 205 (referred to as a first object) and another image (referred to as a second image) including an object obtained by reducing the object 205 (referred to as a second object) in size.

In this case, as a result of search based on the degree of similarity calculated from the detection result of the feature points of the captured image, there is a possibility that the second image, not the first image, is searched for. In this case, the user cannot obtain desired link information. In order to prevent such a situation, in the embodiment, an image stored in the DB 12 is searched for based on time information at the searching unit 103.

FIGS. 4A and 4B illustrate exemplary configurations of the DB 12 according to the embodiment. Illustrated in FIG. 4A is an example of an index table 120 for identifying each piece of index data stored in the DB 12. As exemplified in FIG. 4A, each piece of index data is stored in the DB 12 with an ID and the binary data of the index data associated with each other. The ID format is not in particular limited as long as each piece of index data stored in the DB 12 can be identified.

Illustrated in FIG. 4B is an example of a broadcast time table 121 that associates the ID and broadcast time of an image. In this example, the broadcast time is written in the Extensible Markup Language (XML), which is one of the markup languages that defines and describes the meaning and structure of data using tags. As will be described later, the description of link information is also embedded into the description of this broadcast time. An XML code in which a broadcast time is written may be stored directly in a field of the broadcast time table 121, or may be written in a file separately with its file name and path written in the field.

FIG. 5 illustrates an example of an XML code 140 illustrated in FIG. 4B. The XML code 140 illustrated in FIG. 5 is an example of description concerning a data broadcast that is broadcast in a certain time zone. One data broadcast screen by the data broadcast is defined by the outermost tags  and . In parts $141_1$ and $141_2$, images to be displayed on one data broadcast screen are defined by the tags <timeline> and </timeline>. A plurality of images can be thus defined for one page.

In the part $141_1$, the first line 142 defines the range of an image with, for example, the top-left corner coordinates (x1, y1) and the bottom-right corner coordinates (x2, y2) by the tags <area> and </area>. The range of the image may be represented by absolute coordinates within an effective display area in a broadcasting format or may be represented by relative coordinates in the data broadcast screen.

In respective parts $143_1$ and $143_2$, each one piece of link information is defined by the tags <link> and </link>. A plurality of pieces of link information can be thus defined for one image. In the part $143_1$, the title of the link information is defined by the tags <title> and </title>. The type of the link information is defined by the tags <type> and </type>. In this example, as a piece of link information, address information on the network 10 is defined by the tags <URI> and </URI>.

A broadcast time when the image is broadcast by the data broadcasting is defined in a part 144. For example, a broadcast start time is defined by the tags <start> and </start>, whereas a broadcast end time is defined by the tags <end> and </end>.

These broadcast start time and broadcast end time may be provided with some margins with respect to actual broadcast start and end times. For example, the broadcast start time may be a little later time with respect to the actual broadcast start time with a time lag of the transmission of captured images or the like taken into account. The broadcast end time may be set to be later by, for example, a few hours or a few days, with respect to the actual broadcast end time in accordance with recording or the like.

The image in the data broadcast screen and the link information in the image are thus defined by the XML code 140, thereby executing functions of the link information associated with the object included in the image on the data broadcast screen.

Figure 6:
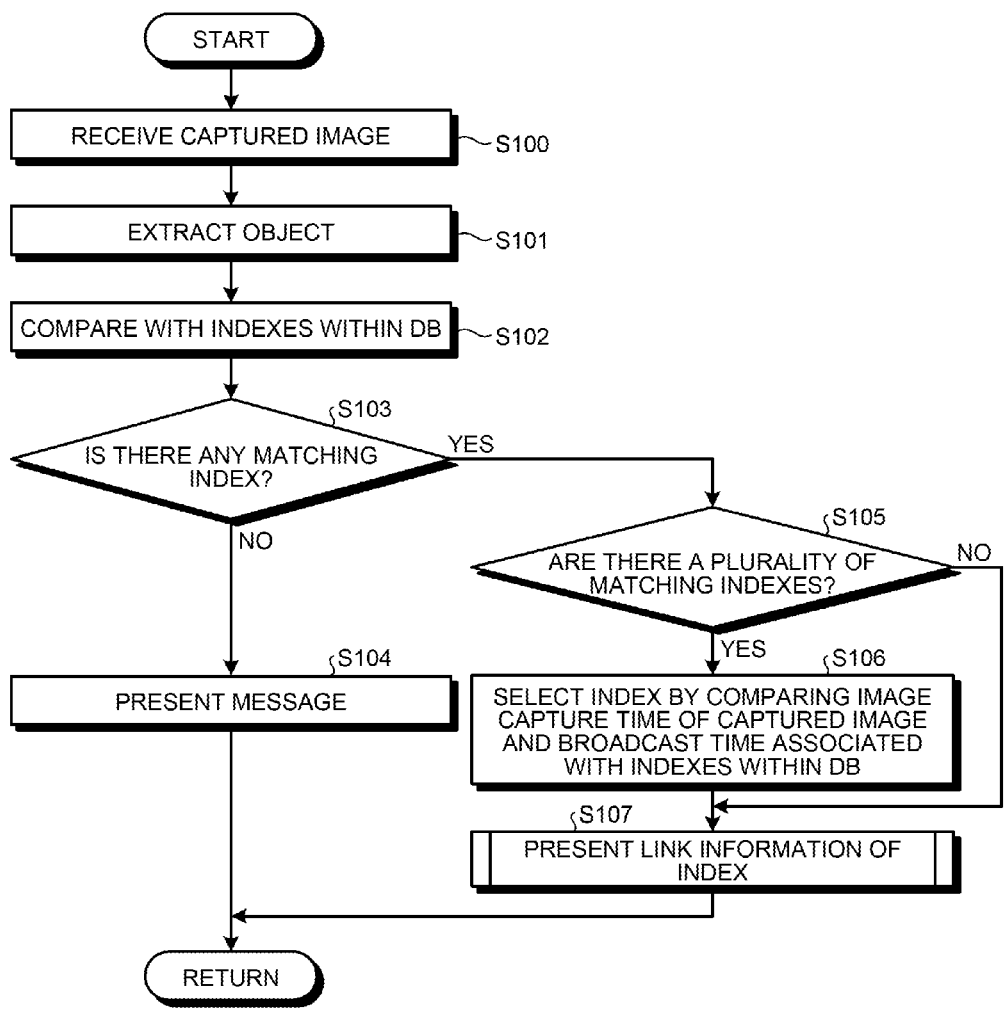
FIG. 6 is a flowchart illustrating an example of the operations of the server according to the embodiment.

FIG. 6 is a flowchart illustrating an example of the operations of the server 11 of the embodiment. First, at Step S100, a captured image captured by the terminal unit 20 is transmitted to the server 11 through the network 10. In the server 11, the receiving unit 100 receives the captured image. At the following Step S101, the extracting unit 101 performs image analysis on the received captured image to detect feature points and extract an object.

At the following Step S102, the calculating unit 102 compares the object included in the captured image with the objects searched for by the indexes stored in the DB 12. More specifically, the calculating unit 102 calculates respective degrees of similarity between the object included in the captured image and the objects searched for by the indexes stored in the DB 12.

At the following Step S103, based on the degrees of similarity calculated at Step S102, the searching unit 103 determines whether there is any index by which an object that matches the object included in the captured image is searched for among the indexes stored in the DB 12. In this example, an object whose degree of similarity is not less than a threshold among the indexes included in the DB 12 is determined to be an index by which the object that matches the object included in the captured image is searched for.

If it is determined that there is an index by which the objects match at Step S103, the searching unit 103 then proceeds to Step S105. At Step S105, the searching unit 103 determines whether the objects match on a plurality of indexes among the indexes stored in the DB 12. If it is determined that the objects match on only one index, the searching unit 103 gives the one index as a search output and then proceeds to Step S107, which will be described later. If it is determined that the objects match on a plurality of indexes, the searching unit 103 then proceeds to Step S106.

At Step S106, the searching unit 103 refers to the DB 12 to acquire broadcast times for the indexes. The time when the captured image was captured and respective broadcast times associated with the respective indexes within the DB 12 are compared with each other, thereby selecting an index from the indexes within the DB 12. For the time when the captured image was captured, for example, the time when the captured image was received by the receiving unit 100 at Step S100 may be used. Without being limited thereto, when a captured image is transmitted as a file, a time indicated by the time stamp of the file may be used as the time when the captured image was captured. Accordingly, time information with respect to the received captured image can be acquired either from the server itself or from an external device that is communicably connected through a network.

The searching unit 103 selects an index including the time when the captured image was captured in between the broadcast start time and the broadcast end time out of the indexes within the DB 12 and makes the index a search output. When a plurality of indexes have been selected here, for example, another determination based on the degree of similarity is performed and an index having the highest degree of similarity of the object searched for out of the selected indexes may be selected as a search output. After obtaining the search output at Step S106, the process proceeds to Step S107.

At Step S107, the presenting unit 104 retrieves the link information associated with the index of the search output by the searching unit 103 from the DB 12. The presenting unit 104 then performs presentation of the retrieved link information to the terminal unit 20 as the source of the captured image. Then, a series of processing in the flowchart of FIG. 6 is ended.

If it is determined that there is no matching index at Step S103, the process proceeds to Step S104 where the presenting unit 104 presents a message indicating the fact that no matching index is stored in the DB 12 to the terminal unit 20. Then, a series of processing in the flowchart of FIG. 6 is ended.

Figure 7:
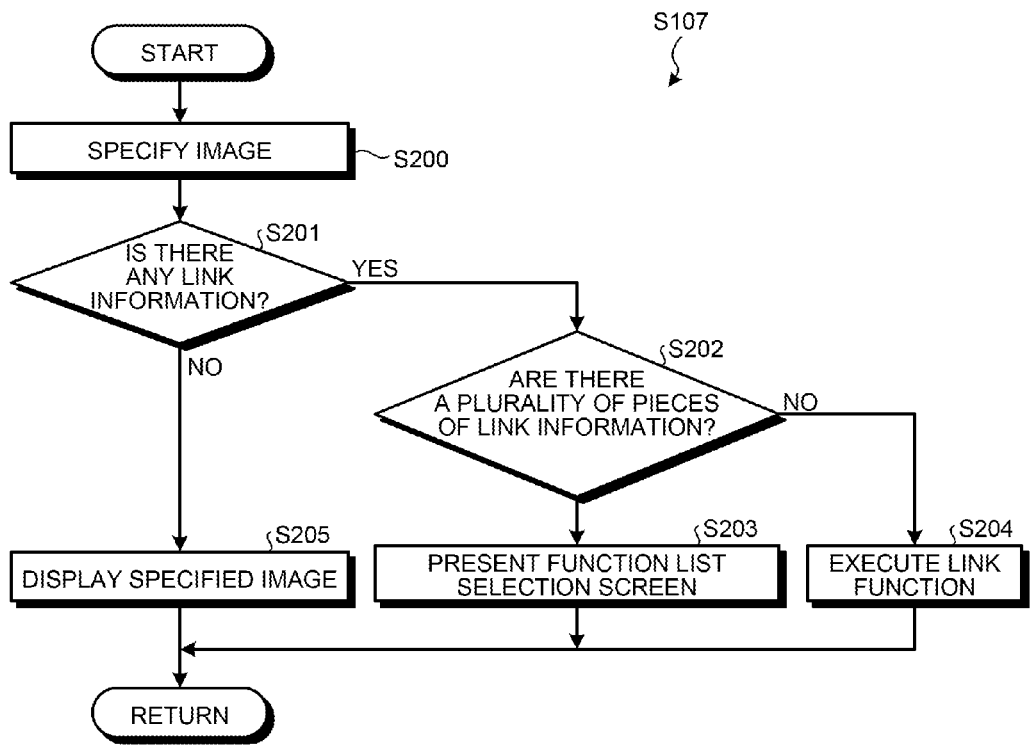
FIG. 7 is a flowchart illustrating an example of the presentation processing of the link information of an index according to the embodiment.

FIG. 7 is a flowchart illustrating an example of the presentation processing of the link information of the index at Step S107 in FIG. 6. First at Step S200, the presenting unit 104 specifies the index of the search output of the searching unit 103. At the following Step S201, the presenting unit 104 refers to the DB 12 to determine whether there is link information associated with the specified index. If it is determined that there is the information, the presenting unit 104 then proceeds to Step S202 to determine whether a plurality of pieces of link information are associated with the index.

If the presenting unit 104 determines that a plurality of pieces of link information are associated with the index at Step S202, it then proceeds to Step S203. At Step S203, the presenting unit 104 generates a function list indicating functions of these pieces of link information and presents a selection screen for selecting one function from the function list to the terminal unit 20. For example, when a URL and a telephone number as link information are associated with a specified target area, a selection screen for selecting a function of accessing the address indicated by the URL and a telephone function to the telephone number is generated and presented to the terminal unit 20. Then, a series of processing in the flowchart of FIG. 7 is ended.

If the presenting unit 104 determines that only one piece of link information is associated with the index at Step S202, it then proceeds to Step S204. At Step S204, a screen for executing the function of the one piece of link information is generated and presented to the terminal unit 20. Then, a series of processing in the flowchart of FIG. 7 is ended.

If it is determined at Step S201 that no link information is associated with the image specified at Step S200, the process proceeds to Step S205. At Step S205, the presenting unit 104 presents a preset image to the terminal unit 20. Then, a series of processing in the flowchart of FIG. 7 is ended.

Although in the above description one index is selected from the indexes at the server 11 side at Step S106, the present invention is not limited to this example. In other words, a user may be prompted to perform the processing of selecting one index from the indexes.

Figure 8:
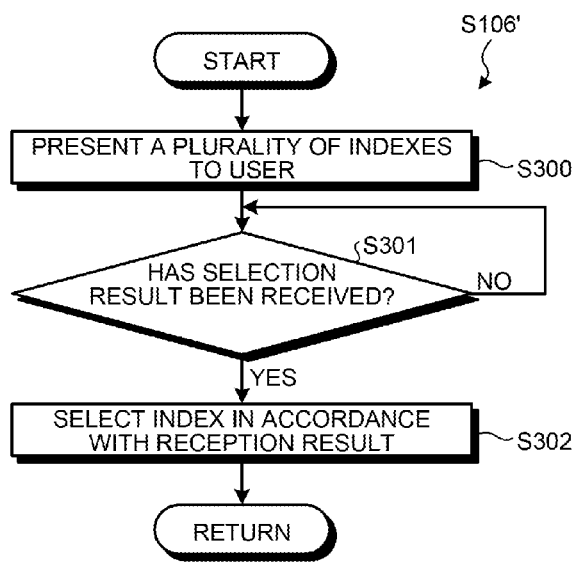
FIG. 8 is a flowchart illustrating exemplary processing when prompting a user to perform processing for selecting one image from a plurality of images according to the embodiment.

FIG. 8 is a flowchart illustrating an exemplary process when prompting a user to perform the processing of selecting one index from a plurality of indexes of the search output of the searching unit 103. If it is determined that matching with the object included in the captured image occurs on the indexes at Step S105 of FIG. 6, the searching unit 103 then proceeds to Step S106' illustrated in FIG. 8.

After the process proceeds to Step S106', the presenting unit 104 generates a screen for presenting information indicating the indexes determined to match to the user and presents it to the terminal unit 20 at Step S300. The presenting unit 104 waits for the reception of a selection result of selecting one index from among the indexes from the terminal unit 20 (Step S301). Upon receiving the selection of one index from the indexes presented at Step S300 from the terminal unit 20, the presenting unit 104 selects one index from the indexes determined to match in accordance with the reception result at Step S302. The presenting unit 104 then retrieves the link information associated with the selected index from the DB 12 and presents it to the terminal unit 20.

In this way, presenting the indexes to the user enables the user to select a desired image more accurately.

The embodiment allows, based on the captured image and the time information, the link information that is associated with the data broadcast screen to be appropriately acquired and to be provided to the terminal unit that the user uses.

Link information has been embedded into a two-dimensional code such as QR Code (registered trademark) and embedded into a data broadcast screen or the like to be displayed. A user captures an image of the two-dimensional code with the terminal unit 20 and applies predetermined processing on the captured image to decode the two-dimensional code, thereby obtaining link information that is associated with the data broadcast screen.

In this method using the two-dimensional code, however, an image of the two-dimensional code with no direct meaning for humans occupies certain space in a display screen, degrading the usability of the screen. In addition, some users may feel uncomfortable with the two-dimensional code displayed on the display screen.

Because of the unnecessity of embedding any special code into the screen, the embodiment can improve the usability of the screen as compared to the case of using the two-dimensional code and avoid making the user uncomfortable.

When the terminal unit 20 can output information indicating the attitude of the terminal unit 20 during image capture such as the tilt angle of a surface perpendicular to an optical axis with respect to the vertical direction, the server 11 determines whether the attitude indicates an angle regarded as the vertical direction based on the information indicating the attitude transmitted together with the captured image. If it is determined that the attitude is not an angle regarded as the vertical direction, it is regarded that the captured image is not one obtained by capturing the display screen 200 of the television receiver 21, and based on that, image search in the DB 12 may be performed using only the degree of similarity, not using the broadcast time.

Figure 9:
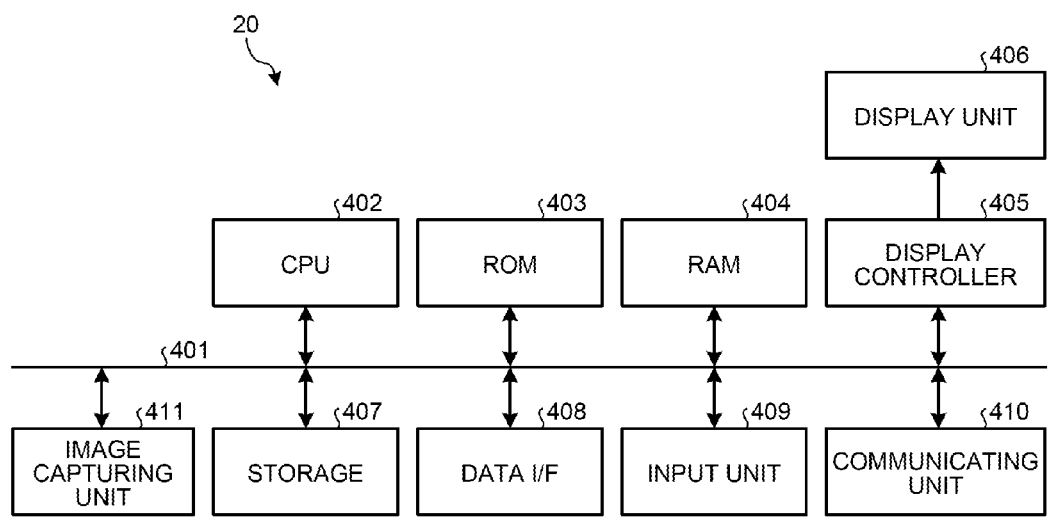
FIG. 9 is a block diagram illustrating an exemplary configuration of a terminal unit according to the embodiment.

FIG. 9 illustrates an exemplary configuration of the terminal unit 20. In the terminal unit 20 exemplified in FIG. 9, a bus 401 connects a CPU 402, a ROM 403, a RAM 404, and a display controller 405. The bus 401 also connects a storage 407, a data I/F 408, an input unit 409, a communicating unit 410, and an image capturing unit 411. The storage 407 is a storage medium that can store therein data in a nonvolatile manner and is a nonvolatile semiconductor memory such as a flash memory. Without being limited thereto, a hard disk drive may be used as the storage 407.

The CPU 402 controls the entire computer 400 according to a computer program stored in the ROM 403 and the storage 407 using the RAM 404 as a working memory. The display controller 405 converts a display control signal generated by the CPU 402 into a signal that can be displayed by a display unit 406 and outputs it.

The storage 407 stores therein the above program to be executed by the CPU 402 and various types of data. The data I/F 408 performs the inputting of external data. As the data I/F 408, an interface based on the universal serial bus (USB), the Institute of Electrical and Electronics Engineers 1394 (IEEE1394), or the like may be applicable.

The input unit 409 includes an input device for receiving user input. The user operates the input device in accordance with, for example, display on the display unit 406, thereby giving instructions to the terminal unit 20. It is preferable that the input device for receiving user input is integrated with the display unit 406 to be constructed as a touch panel that outputs a control signal in accordance with a pressed position and allows an image on the display unit 406 to be transmitted.

The communicating unit 410 performs communications with the network 10 using a predetermined protocol. The image capturing unit 411 includes an optical system, an image capturing element, and a control drive circuit for the optical system and the image capturing element. The image capturing unit 411 performs predetermined processing on signals output from the image capturing element to be output as image data. The image capturing unit 411 performs the functions of image capture, zooming, or the like in accordance with instructions through user operations on the input unit 409. A captured image captured and obtained by the image capturing unit 411 is sent to the communicating unit 410 through the bus 401, and transmitted to the server 11 through the network 10 in accordance with an instruction of the CPU 402, for example.

The terminal unit 20 may be further provided with an angle sensor that detects angles about the three axes of x, y, and z. The output of the angle sensor may be attached to the captured image and transmitted to the server 11, for example.

In the foregoing configuration, the terminal unit 20 can display information presented by the presenting unit 104 of the above server 11 using a browser application for browsing web sites on the network 10. The terminal unit 20 can transmit requests and data to the server 11 using the browser application.

In this case, in the server 11, the presenting unit 104 generates display control information for presenting information to the terminal unit 20 using the HyperText Markup Language (HTML) and various script languages, and places the generated file on a predetermined address on the network 10. The terminal unit 20 is informed of the address from the presenting unit 104, and thus can access the display control information and display the presentation of information with the presenting unit 104.

Figure 10:
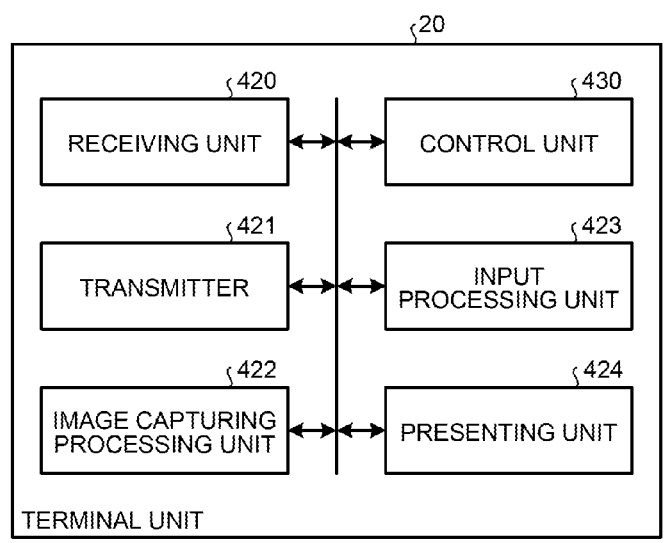
FIG. 10 is a functional block diagram illustrating exemplary functions of the terminal unit according to the embodiment.

Without being limited thereto, the terminal unit 20 may be installed with an application that performs a series of processing ranging from the transmission of the captured image to the display of the presented information. FIG. 10 is a functional block diagram illustrating exemplary functions of the terminal unit 20 in this case. The terminal unit 20 includes a receiving unit 420, a transmitter 421, an image capturing processing unit 422, an input processing unit 423, a presenting unit 424, and a control unit 430.

The image capturing processing unit 422 controls the image capturing operation by the image capturing unit 411 and acquire a captured image. The transmitter 421 has address information on the network 10 of the server 11 in advance, for example, and performs transmission processing to the server 11 through the network 10. The transmitter 421 transmits the captured image acquired by the image capturing processing unit 422 to the server 11. The receiving unit 420 receives the information transmitted from the server. For example, the receiving unit 420 receives the information presented by the presenting unit 104 of the server 11.

The input processing unit 423 processes user input to the input unit 409 as hardware. The presenting unit 424 passes a UI image prepared in advance to the display controller 405 and allows the display unit 406 to display a screen of this UI image. The presenting unit 424 generates a display screen based on, for example, the information presented by the presenting unit 424 of the server 11 and received by the receiving unit 420, and allows the display unit 406 to display it through the display controller 405. The information presentation by the presenting unit 424 may also be performed by voice instead of display.

The control unit 430 controls the entire operation of the terminal unit 20. The control unit 430 can execute linking functions based on the link information corresponding to the captured image presented by the presenting unit 104 of the server 11. For example, when a URL is designated as the link information, the control unit 430 may call the browser application installed in the terminal unit 20 to access the address indicated by this URL.

The receiving unit 420, the transmitter 421, the image capturing processing unit 422, the input processing unit 423, the presenting unit 424, and the control unit 430 are achieved by a terminal-oriented program that operates on the CPU 402. This terminal-oriented program is stored in a computer connected to the network 10 and is provided by being downloaded through the network 10. The terminal-oriented program may be provided or distributed through the network 10. The terminal-oriented program may be stored in advance and provided in the ROM 403.

Without being limited thereto, the terminal-oriented program may be recorded in a computer-readable storage medium such as a CD or a DVD as a file in an installable or executable format. In this case, the terminal-oriented program may be provided to the terminal unit 20 through an external drive device connected to the data I/F 408.

The terminal-oriented program has a modular configuration including the above units (the receiving unit 420, the transmitter 421, the image capturing processing unit 422, the input processing unit 423, the presenting unit 424, and the control unit 430), and as actual hardware, the CPU 402 reads the terminal-oriented program from, for example, the storage 407 and executes it, thereby loading and generating the above units into a main storage (for example, the RAM 404).

In the above embodiment, the time information can be used as identifying information for use in identifying whether the received captured image is obtained by capturing a broadcast medium, not only for use in identifying the link information. The identifying information is not limited thereto. For example, the above tilt angle may be used. In this case, the server 11 holds a predetermined tilt angle as a threshold. Based on whether the tilt angle transmitted from the terminal unit 20 together with the captured image is less than the threshold, it may be determined whether the captured image is obtained by capturing the broadcast medium.

When a subject to be captured is not limited to a still image medium but extended to a broadcast medium, it is more preferable to identify which medium was set as the subject to be captured. For example, it is assumed that an item A (object) is put on a magazine, while the item A (object) is introduced in a telephone-shopping program. It is also assumed that a purchase site on the Internet is registered as the link information of the item A of the magazine, and a telephone number for purchasing the item A is registered as the link information of the item A of the telephone-shopping program. In this case, if it is not identified which medium was set as the subject to be captured, there arises a possibility that appropriate link information is not presented to the user. With the subject to be captured being identified, the user can receive the presentation of appropriate link information.

For example, it is assumed that the DB 12 stores therein an index for searching for image data for a magazine medium registered by a magazine company and an index for searching for image data for a broadcast medium registered by a broadcasting station. It is also assumed that the indexes each are stored for a medium through medium identifying information for identifying the medium and are associated with link information. They may be managed in separate DBs for media. A method for managing indexes in an identifiable manner for a medium is not limited thereto.

Based on that, the server 11 receives a captured image, identifies which medium is set to be the subject to be captured by the captured image, and then searches for the stored index based on the captured image to present link information. The identifying information for identifying the medium of the subject to be captured may be either obtained by receiving one transmitted from the terminal unit 20 or acquired by the server 11 itself.

Because a broadcast time is present for broadcast data but is absent for magazines, documents, or the like, time information has been described as an example of the identifying information. Other examples include, in addition to tilt angle, position information by GPS, RFID, or the like, access history information, and registration information held by the terminal unit 20 (address, channel registration, or the like). When application programs corresponding to respective media are installed at the terminal unit side, an application ID or the like may be also used. Even with one application program, the identifying information for identifying which medium is captured may be transmitted to the server 11 together with the captured image. The present invention is again not limited thereto.

Without being limited to the time information, supplementary information for use in the link information may be program identifying information, channel information, or the like may be used, and again the present invention is not limited thereto. In other words, supplementary information may be any condition or identifying information allowing a specific index to be searched for out of a plurality of indexes for searching for the same object.

Accordingly, the DB 12 stores therein an index for searching for an object, first supplementary information (supplementary information for distinguishing the index from other indexes for searching for the object, such as the broadcast time of the image), and the link information indicating the function that provides a link for the object, in association with each other. By the functions of the embodiment that selects an index for searching for the object included in the received captured image using the indexes stored in the DB 12 based on the object included in the captured image received through a network and second supplementary information for the captured image (the image capture time or the like), an appropriate index can be searched for out of a plurality of indexes for searching for the same object, and link information can be identified.

For a first medium (paper media such as magazines and documents) as a subject to be captured, the DB 12 stores therein an index for searching for an object and link information indicating the function that provides a link for the object in association with each other. For a second medium (moving image media such as broadcast data or the like) as a subject to be captured, the DB 12 stores therein an index for searching for an object and link information indicating the function that provides a link for the object in association with each other. By the functions of the embodiment that receives a captured image through a network and selects an index for searching for the object included in the received captured image by the indexes stored in the DB 12 based on identifying information for identifying a medium set to be the subject to be captured of the received captured image, even when various media are subjects to be captured, an index in accordance with the medium is searched for and the link information can be provided appropriately.

Although in the above description the embodiment is applied to the digital television broadcasting, the present invention is not limited thereto. The embodiment can also be applied, for example, to a digital signage system that displays advertising with digital information.

According to the embodiment, it is possible to provide the effect of facilitating access to information that is distributed by the digital information distribution system and displayed on a display screen.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A search apparatus comprising:
a storage device configured to store therein indexes for searching for images included in a moving image, link information providing a link associated with an object included in one of the images, and first time information associated with one of the images, the first time information including a broadcast time period when a provider transmitted the moving image;
a receiver configured to receive a captured image from a terminal through a network, the terminal generating the captured image by capturing the moving image, the captured image including an extracted object therein;
a memory and a processor, the memory containing computer readable code that, when executed by the processor, configures the processor to,
acquire second time information, the second time information including a capture time when the terminal captured the moving image as the captured image, and
search for an identified index corresponding to one of the stored images including the object matching the extracted object from among the stored indexes based on the first time information and the second time information such that (i) the capture time occurs within the broadcast time period associated with the identified index and (ii) a degree of similarly between the captured image and the stored image associated with the identified index is greater than other stored images associated with other ones of the stored indexes; and
a transmitter configured to transmit the link information associated with the identified index to the terminal.

2. The search apparatus according to claim 1, wherein the processor is further configured to acquire the first time information by searching an electronic program guide (EPG) based on a program name associated with the image.

3. The search apparatus according to claim 1, wherein the processor is further configured to,
extract a captured object included in the captured image to generate the extracted object,
calculate the degree of similarity between the stored images associated with the stored indexes and the extracted object from the captured image, and
search for the identified index from among the stored indexes based on the degree of similarity, the second time information, and the first time information.

4. The search apparatus according to claim 3, wherein the processor is configured to,
search for an index whose degree of similarity is not less than a threshold from among the stored indexes, and
select as the identified index an index in which the first time information corresponds to the second time information from among the stored indexes.

5. The search apparatus according to claim 4, wherein when one piece of link information is associated with the identified index, the processor is configured to execute a function indicated by the one piece of link information, and
when a plurality of pieces of link information are associated with the identified index, the processor is configured to transmit a message that prompts selection of one piece of link information from the pieces of link information to the terminal.

6. The search apparatus according to claim 1, wherein
the link information includes an access method for accessing attribute information of the object indicated by the index associated with the link information, and
the attribute information includes information indicating an object acquisition method.

7. The search apparatus of claim 1, wherein the receiver is configured to receive both the captured image and the second time information associated therewith from the terminal such that the second time information indicates the time the image was captured by the terminal.

8. A search method executed by a search apparatus, the method comprising:
storing indexes for searching for images included in a moving image, link information providing a link associated with an object included in one of the images, and first time information associated with one of the images, the first time information includes a broadcast time period when a provider transmitted the moving image;
receiving a captured image from a terminal through a network, the terminal generating the captured image by capturing the moving image, the captured image including an extracted object therein;
acquiring second time information, the second time information including a capture time when the terminal captured the moving image as the captured image;
searching for an identified index corresponding to one of the stored images including the object matching the extracted object from among the stored indexes based on the first time information and the second time information such that (i) the capture time occurs within the broadcast time period associated with the identified index and (ii) a degree of similarly between the captured image and the stored image associated with the identified index is greater than other stored images associated with other ones of the stored indexes; and
transmitting the link information associated with the identified index to the terminal.

9. The search method according to claim 8, further comprising:
acquiring the first time information by searching an electronic program guide (EPG) based on a program name associated with the image.

10. The search method according to claim 8, further comprising:
extracting a captured object included in the captured image to generate the extracted object; and
calculating the degree of similarity between the stored images associated with the stored indexes and the extracted object from the captured image, wherein
the searching includes searching for the identified index from among the stored indexes based on the degree of similarity, the second time information, and the first time information.

11. The search method according to claim 10, wherein
the searching includes searching for an index whose degree of similarity is not less than a threshold from among the stored indexes, and the method further comprises:
selecting as the identified index an index in which the first time information corresponds to the second time information from among the stored indexes.

12. The search method according to claim 11, wherein
the searching includes executing, when one piece of link information is associated with the identified index, a function indicated by the one piece of link information, and
the searching includes transmitting, when a plurality of pieces of link information are associated with the identified index, a message to the terminal, the message prompting the terminal to select of one piece of link information from the pieces of link information.

13. The search method according to claim 8, wherein
the link information includes an access method for accessing attribute information of the object indicated by the index associated with the link information, and
the attribute information includes information indicating an object acquisition method.

14. The search method according to claim 8, wherein the receiving receives both the captured image and the second time information associated therewith from the terminal such that the second supplemental information indicates the time the image was captured by the terminal.

15. A search system comprising:
a terminal configured to transmit a captured image through the network, the terminal generating the captured image by capturing a moving image transmitted by a provider; and
a search apparatus including,
a storage device configured to store therein indexes for searching for images included in the moving image, and link information providing a link associated with an object included in one of the images, and first time information associated with one of the images, the first time information including a broadcast time period when the provider transmitted the moving image; and
a receiver configured to receive the captured image from the terminal through the network, the captured image including an extracted object therein,
a memory and a processor, the memory containing computer readable code that, when executed by the processor, configures the processor to,
acquire second time information, the second time information including a capture time when the terminal captured the moving image as the captured image, and
search for an identified index corresponding to one of the stored images including the object matching the extracted object from among the stored indexes based on the first time information and the second time information such that (i) the capture time occurs within the broadcast time period associated with the identified index and (ii) a degree of similarly between the captured image and the stored image associated with the identified index is greater than other stored images associated with other ones of the stored indexes; and
a transmitter configured to transmit the link information associated with the identified index to the terminal.

16. The search system according to claim 15, wherein
the processor includes a plurality of distributed processors.

17. The search system according to claim 15, wherein the terminal includes,
a display unit configured to display a screen based on the link information, and
an image transmitter configured to transmit the captured image to the search apparatus through the network.

18. The search system according to claim 15, wherein the receiver of the search apparatus is configured to receive both the captured image and the second time information associated therewith from the terminal such that the second time information indicates the time the image was captured by the terminal.

* * * * *